Dec. 18, 1951 J. W. BELL 2,578,963
COTTON TOPPER
Filed Oct. 17, 1947 2 SHEETS—SHEET 1
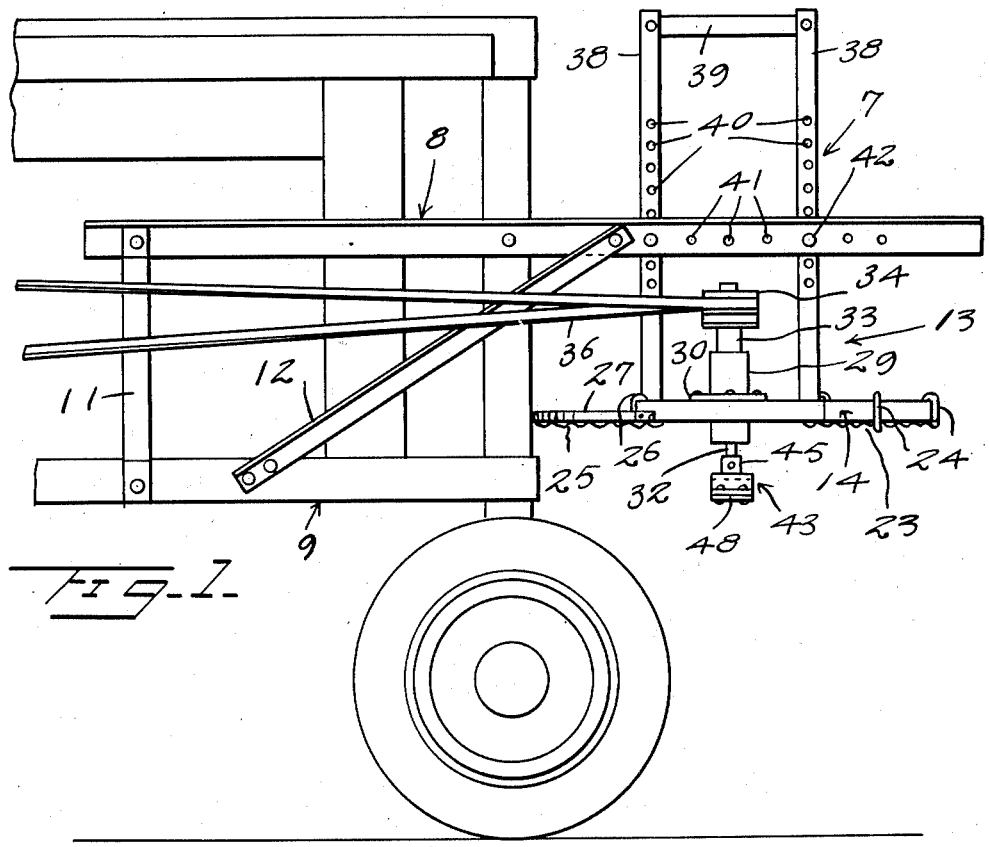
Fig. 1.
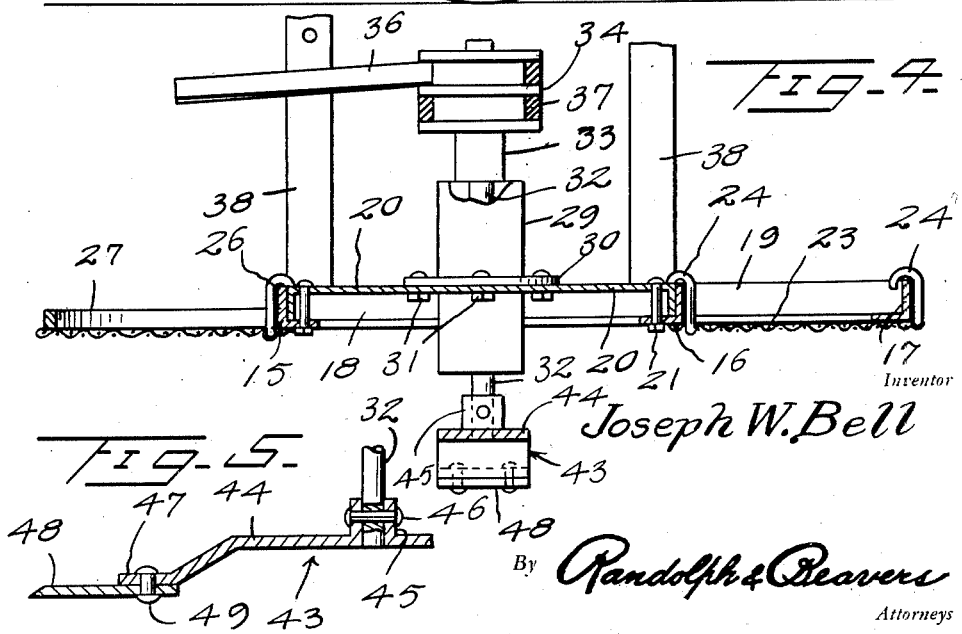
Fig. 4.
Fig. 5.
Inventor
Joseph W. Bell
By Randolph & Beavers
Attorneys

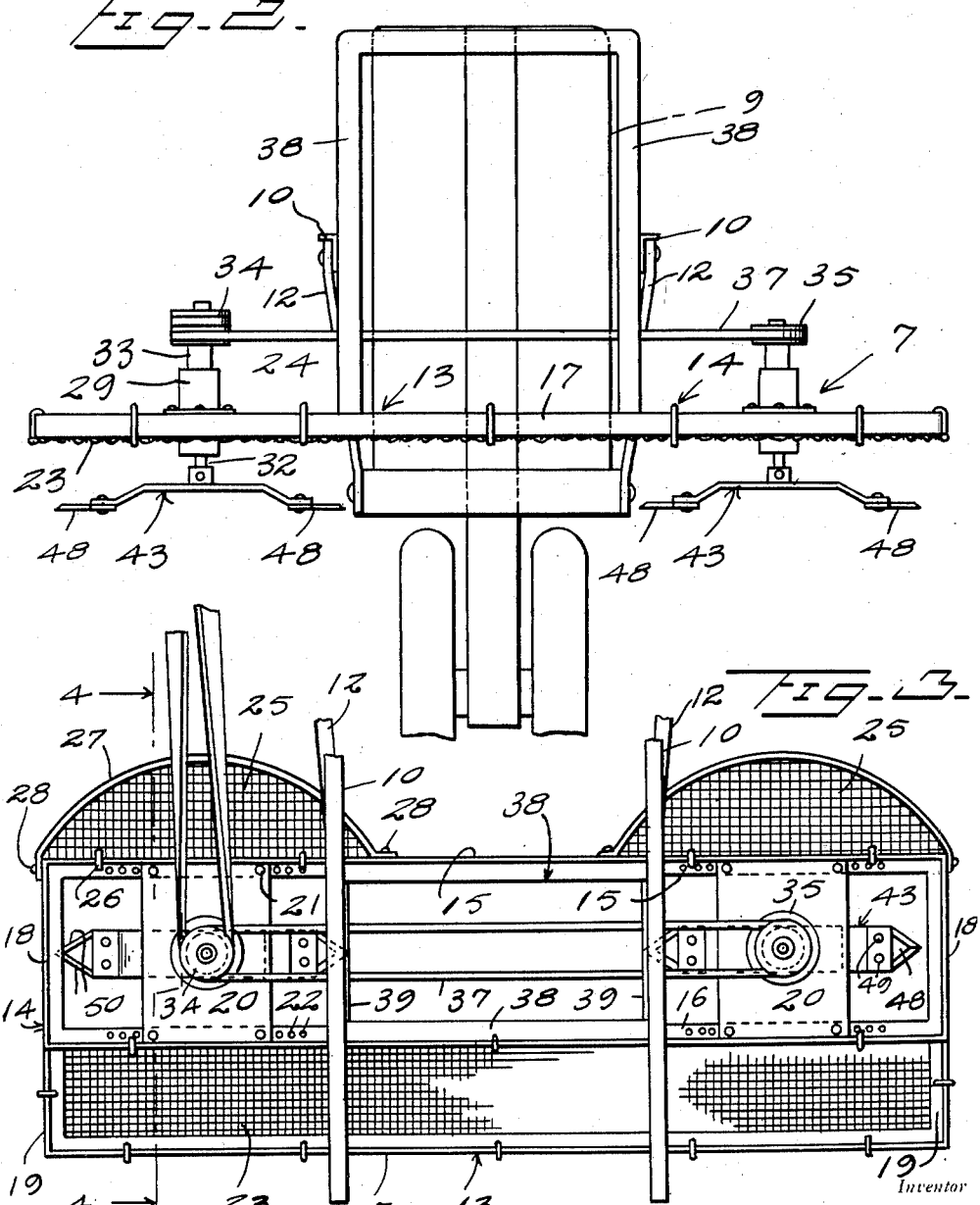

Patented Dec. 18, 1951

2,578,963

UNITED STATES PATENT OFFICE 2,578,963

COTTON TOPPER

Joseph W. Bell, Augusta, Ga.

Application October 17, 1947, Serial No. 780,310

1 Claim. (Cl. 56—11)

This invention relates to a novel cotton topper attachment for tractors and more particularly to an attachment adapted to be detachably and adjustably supported on a tractor and disposed forwardly thereof and driven by the power take-off or belt pulley of the tractor for simultaneously cutting the tops out of two rows of growing cotton.

The topping or cutting out of the tops of growing cotton plants is very beneficial due to the fact that it results in the plants spreading, rather than growing tall, and thereby producing a greater yield. The topping of cotton plants also permits the sun to reach the lower branches of the plant and is beneficial in combating boll weevil. The expense of accomplishing the topping of cotton by hand labor has discouraged the adoption of this operation generally.

Accordingly, it is the primary object of the present invention to provide an attachment which may be readily utilized for economically topping growing cotton plants and by the use of which one man may top as many as thirty five acres of cotton in a single day.

A further object of the invention is to provide an attachment of extremely simple construction, capable of being economically manufactured and sold and which may be readily applied to and removed from conventional tractors and supported and operated thereby.

A still further object of the invention is to provide a cotton topping attachment which may be vertically adjusted for topping cotton plants of various heights.

Various other objects and advantages of the invention will hereinafter become more fully apparent from the following description of the drawings, illustrating a preferred embodiment thereof, and wherein:

Figure 1 is a side elevational view showing the cotton topper attachment mounted on the forward end of a tractor;

Figure 2 is a front elevational view thereof;

Figure 3 is a fragmentary plan view of the forward portion of the attachment;

Figure 4 is an enlarged vertical sectional view thereof taken substantially along a plane as indicated by the line 4—4 of Figure 3, and Figure 5 is an enlarged fragmentary longitudinal sectional view of one of the knives.

Referring more specifically to the drawings, the cotton topper attachment, designated generally 7 and comprising the invention includes a supporting structure 8 which is adapted to be demountably attached to the sides of a tractor 9 adjacent the forward end thereof and which includes a pair of longitudinal beams 10, one of which is disposed on each side of the tractor 9 and which beams 10 extend forwardly substantially beyond the forward end of the tractor 9. The beams 10 are preferably formed of angle iron, as clearly illustrated in Figure 2. The supporting structure 8 also includes a pair of braces 11 and 12 for reinforcing each of the beams 10 relatively to the tractor 9.

A cotton topper frame, designated generally 13, includes a base 14 of open work construction preferably formed of angle iron and which is disposed forwardly of the tractor 9 and transversely thereof and which includes spaced longitudinal members 15, 16 and 17 which are connected by end members 18 which are formed integral with or fixedly secured to ends of the members 15 and 16 and by the end members 19 which extend inwardly from the member 17 and join with the ends of the member 16. The longitudinal members 15 and 16 are connected adjacent their ends by plates 20 which are adjustably secured thereto by fastenings 21 which selectively engage openings 22 in said members 15 and 16. The space between longitudinal members 16 and 17 is covered by a mesh wire fabric strip 23 supported by hooks 24 which are secured thereto and which engage over the upper edges of said members 16 and 17, which are formed likewise of angle iron. A mesh wire fabric screen 25 is supported adjacent each end of the rear or inner longitudinal member 15 and extends inwardly or rearwardly therefrom and is provided with a substantially straight edge disposed adjacent the member 15 and supported thereon by hooks 26, corresponding to the hooks 24 and in the same manner. The rear, convex edge of each screen 25 is attached to an arcuate frame member 27 which is secured by fastenings 28 at its ends to the member 15 and the end members 18.

As best seen in Figure 4, a bearing 29 extends vertically through each of the plates 20 and is provided with a surrounding flange 30 which rests on said plate 20 and is detachably secured thereto by fastenings 31. A shaft 32 extends through and is journalled in each of the bearings 29. Said shafts are provided with enlarged upper ends 33 for supporting the shafts in the bearings 29 and one of which portions 33 is provided with a double pulley 34 and the other which is provided with a single pulley 35. An endless belt 36 is trained around the upper groove of the pulley 34 and extends rearwardly therefrom and is adapted to be trained over a drum of the power take-off shaft or belt pulley, not shown, of the tractor 9 for rotating the pulley 34 when said power take-off shaft is in operation. An endless belt 37 is trained over the lower groove of the pulley 34 and the pulley 35 for driving said last mentioned pulley and the shaft to which it is secured from the pulley 34.

A pair of arch-shaped members 38 is secured to the frame base 14 at their lower ends by suitable connections thereof to the members 15 and 16 and extend upwardly therefrom between the forward ends of the supporting beams 10. The arched members 38 are preferably formed of angle iron and are preferably connected adjacent their upper ends by braces 39. The legs of the arched members 38 are provided with longitudinally spaced openings 40 and the forward end portions of the beams 10 are provided with longitudinally spaced openings 41. Nut and bolt fastenings 42 extend selectively through the openings 40 and 41 for detachedly and adjustably supporting the frame 13 on the supporting structure 8 and it will be readily apparent that the frame 13 may be raised or lowered relatively to the beams 10 and adjustably disposed forwardly or rearwardly with respect to the forward end of the tractor 9.

A knife, designated generally 43 is demountably secured intermediate of its ends to the lower end of each shaft 32. Each knife 43 includes an elongated bar 44 having a perpendicular sleeve 45 intermediate of its ends for receiving the lower end of one of the shafts 32 and which is suitably fixed thereto as by means of a rivet 46. The end portions of the bar 44 are downwardly offset with respect to the intermediate portions thereof and each of the said downwardly offset ends 47 detachably mounts a knife blade 48 by means of two fastenings 49. The blades 48, as best seen in Figure 3, each have outwardly converged sharpened edges 50 forming the cutting edges of the knife.

From the foregoing it will be readily apparent that the frame 13 may be adjustably supported by the supporting structure 8 in front of the tractor 9 and when the belt 36 is driven both of the shafts 32 and the two knives 43, fixed thereto, will be rotated thereby. The front wheels of the tractor 9 are adapted to be driven between two rows of growing cotton and the attachment 7 as the tractor thus moves along the cotton rows will function to cut the tops out of the cotton plants by the cutting action of the blade edges 50. The knives 43 are adapted to be revolved at a high rate of speed, for example, at approximately 3,000 R. P. M. and when so driven will effectively top all of the cotton plants in two rows to substantially the same level. The screens 23 and 25 are provided merely as guards for the knives 43. It will also be readily apparent that the plates 20, supporting the shafts 32 and knives 43, may be adjusted longitudinally in the base 14 or transversely of the tractor 9 for accommodating the attachment 7 to plant rows spaced different distances apart and as previously stated, the frame 13 can be raised or lowered relatively to the beams 10 for topping the cotton plants at any level.

Various modifications and changes are likewise contemplated and may be obviously resorted to, without departing from the spirit or scope of the invention as hereinafter defined by the appended claim.

I claim as my invention:

The combination with a tractor, of a cotton topping attachment including a supporting structure secured to the sides of the tractor and extending beyond its forward end, an elongated frame disposed transversely across the front of the tractor, a pair of arch members secured to and rising from the intermediate portion of the frame, means adjustably fastening the arch members to the supporting structure for supporting the frame at different levels above and below the plane of the bottom of the tractor chassis, said frame having spaced beams extending longitudinally thereof to beyond the sides of the tractor defining a frame opening therebetween, journal plates secured to said beams adjacent their ends and disposed in said frame opening beyond the sides of the tractor, a driven shaft journaled in each plate and supported thereby in an upright position, a knife fixed to each shaft and rotatable therewith beneath the frame, said frame having portions disposed forward of and behind said journal plates defining front and rear frame openings beneath which the knives revolve, and strips of mesh wire fabric connected to the frame and covering said front and rear frame openings.

JOSEPH W. BELL.

REFERENCES CITED

The following references are of record in the file of this patent:

UNITED STATES PATENTS

| Number | Name | Date |
|---|---|---|
| 273,469 | Coldwell et al. | Mar. 6, 1883 |
| 852,715 | Griffith | May 7, 1907 |
| 1,068,647 | Habecker | July 29, 1913 |
| 1,206,642 | Alchevsky | Nov. 28, 1916 |
| 1,600,877 | Harden | Sept. 21, 1926 |
| 1,833,001 | Smith | Nov. 24, 1931 |
| 2,193,712 | Campbell | Mar. 12, 1940 |
| 2,390,321 | Packwood | Dec. 4, 1945 |